United States Patent [19]

Coleman

[11] 4,330,717
[45] May 18, 1982

[54] PHASE ADJUSTMENT CIRCUIT
[75] Inventor: Allen K. Coleman, Manchester, Conn.
[73] Assignee: United Technologies Corporation, Hartford, Conn.
[21] Appl. No.: 209,080
[22] Filed: Nov. 21, 1980

Related U.S. Application Data

[63] Continuation of Ser. No. 973,301, Dec. 26, 1978.
[51] Int. Cl.$^3$ .............................................. H02J 3/32
[52] U.S. Cl. ...................................... 307/46; 307/66; 328/133; 363/96
[58] Field of Search ........................ 331/1 A, DIG. 2; 328/133; 307/64, 66, 46; 363/35, 37, 96, 128, 137; 323/207

[56] References Cited

U.S. PATENT DOCUMENTS

| | | | |
|---|---|---|---|
| 3,199,037 | 8/1965 | Graves | 323/101 |
| 3,337,814 | 8/1967 | Brase et al. | 331/1 A |
| 3,551,826 | 12/1970 | Sepe | 331/1 A |
| 3,863,134 | 1/1975 | Pollard | 363/137 |
| 3,872,397 | 3/1975 | Hanneman | 331/1 A |
| 4,071,780 | 1/1978 | Burnett | 331/1 A |
| 4,241,261 | 12/1980 | Ebert | 307/64 |
| 4,251,735 | 2/1981 | Coleman | 307/66 |
| 4,251,736 | 2/1981 | Coleman | 307/66 |

OTHER PUBLICATIONS

IEEE Paper F 77101-9, "The Interaction of Batteries and Fuel Cells with Electrical Distribution Systems:***", Jan. 30, 1977.

*Primary Examiner*—William H. Beha, Jr.
*Attorney, Agent, or Firm*—Richard P. Lange

[57] ABSTRACT

A phase adjustment circuit for sensing the phase of the signal at the output of an inverter and for providing a signal to the control circuits of the inverter whose phase has been offset by a preselected amount. The phase adjustment circuit includes a zero crossover detector for sensing the crossover points of the inverter output voltage. A phase-locked loop includes a phase comparator which receives the signal indicating the zero crossover points and a feedback signal from a phase shifter. The output of the phase comparator is an error signal which is integrated and presented to a voltage controlled oscillator to change the phase of its output signal. The phase shifter combines the phased waveform out of the voltage controlled oscillator with a command signal indicating the desired phase offset to form a feedback signal for presentation to the phase comparator closing the feedback loop. At the same time, the phase comparator provides a signal to the control circuit of the inverter whose phase has been precisely controlled to lead or lag the inverter output waveform by the desired offset.

7 Claims, 2 Drawing Figures

PHASE ADJUSTMENT CIRCUIT

This is a continuation of application Ser. No. 973,301 filed on Dec. 26, 1978.

BACKGROUND OF THE INVENTION

1. Field of the Invention

This invention relates to a system for controlling the phase of a signal waveform supplied to the control system of a solid state converter. More specifically, it involves a digital phase shifter which is positioned in a phase-locked loop to generate a phased output signal which is independent of any nonlinearity or amplitude variation of the line reference.

2. Description of the Prior Art

In the control circuitry of a solid state inverter or the like, it is often necessary to sense electrical waveforms in one circuit and then generate a control signal which accurately reflects phase offset from a predetermined reference. A conventional method for sensing the phase error in the waveform in an AC signal is to present the AC signal to a filter which passes only that signal in the frequency range of interest. A phase shifter receives the filtered signal and this signal is combined with a variable threshold signal to generate an output signal whose phase is indicative of the desired phase. However, if the reference signal varies in amplitude or is otherwise nonlinear, the output waveform from the phase shifter tends to be in error.

Of interest is U.S. Pat. No. 3,991,319 issued Nov. 9, 1976 to J. Servos on STANDBY POWER SUPPLY SYSTEM. It discloses a feedback loop for maintaining synchronization between the DC and AC inputs. A phase detector receives a feedback signal from the inverter and also senses the AC line voltage. The output from the phase detector is presented through a phase feedback switch to a voltage controlled oscillator to vary the frequency and phase of the output signal.

Also of interest is U.S. Pat. No. 3,987,359 issued Oct. 19, 1976 to F. Thompson for PHASE ANGLE FUNCTION GENERATOR FOR STATIC VAR CONTROL. This reference describes a system which includes a timing generator for a phase-locked loop including a phase comparator, a filter and a voltage controlled oscillator. Also of interest is U.S. Pat. No. 3,987,360 issued Oct. 19, 1976 to M. Brennen et al on HIGH ACCURACY FAST RECOVERY REFERENCE TIMING SIGNAL FOR A STATIC VAR GENERATOR in which a phase-locked loop is utilized for providing accurate phase information and rapid capture.

Also of interest is the micropower phase-locked loop circuit disclosed in the RCA Solid State-74 Data Book Series on page 226. In this device a phase comparator feeds a low pass filter whose output is presented to a voltage controlled oscillator. An input to the voltage control oscillator is provided to create a frequency offset if desired. The output of the VCO is fed back to the phase comparator to close the feedback loop.

A problem with the heretofore described prior art phase control schemes is that a command or instructional signal which is to change the phase of the output signal is generally combined with the sensed signal at or before the phase comparator. In that this command signal is typically derived from a calibrated reference, amplitude variation in the sensed sinusoidal signal can erroneously appear in the output waveform as a variation in phase. In addition many of the prior art devices will not provide both a leading and lagging phase offset with respect to the sensed signal.

SUMMARY OF THE INVENTION

A primary object of the present invention is to provide an improved phase shift circuit which is more linear over its operating range, particularly at phase angles away from the zero crossover points.

A particular feature of the phase shifter according to the present invention used in a phase-locked loop control circuit is that the phase of an output control signal can be adjusted to lead or lag a sensed signal. In addition, this phase adjustment can be precisely controlled, to one-eighth of an electrical degree or finer, and is essentially independent of any amplitude fluctuation of the sensed signal.

According to the present invention, a phase adjustment circuit is disclosed for sensing the phase of the electrical waveforms in one circuit and providing an output signal to another circuit whose phase has been varied by a preselected amount. The phase adjustment circuit includes a zero crossover detector for sensing the crossover point of the signal to be sensed and presented to a phase-locked loop. A phase-locked loop comprises a phase comparator which receives the signal indicating the zero crossover points of the sensed referenced signal. The filtered output of the phase comparator is supplied to a voltage controlled oscillator (VCO). A phase shifter receives the output of the VCO and combines it with an offset signal for providing an output signal whose phase has been adjusted by the desired offset. Another output from the phase controller is presented to the phase comparator to complete the feedback loop to maintain the closed circuit operation of the phase-locked loop.

These and other objects, features and avantages of the present invention will become more apparent in light of the following detailed description of the illustrated embodiment, as shown in the accompanying drawing.

DETAILED DESCRIPTION OF THE ILLUSTRATED EMBODIMENT

Figure 1:
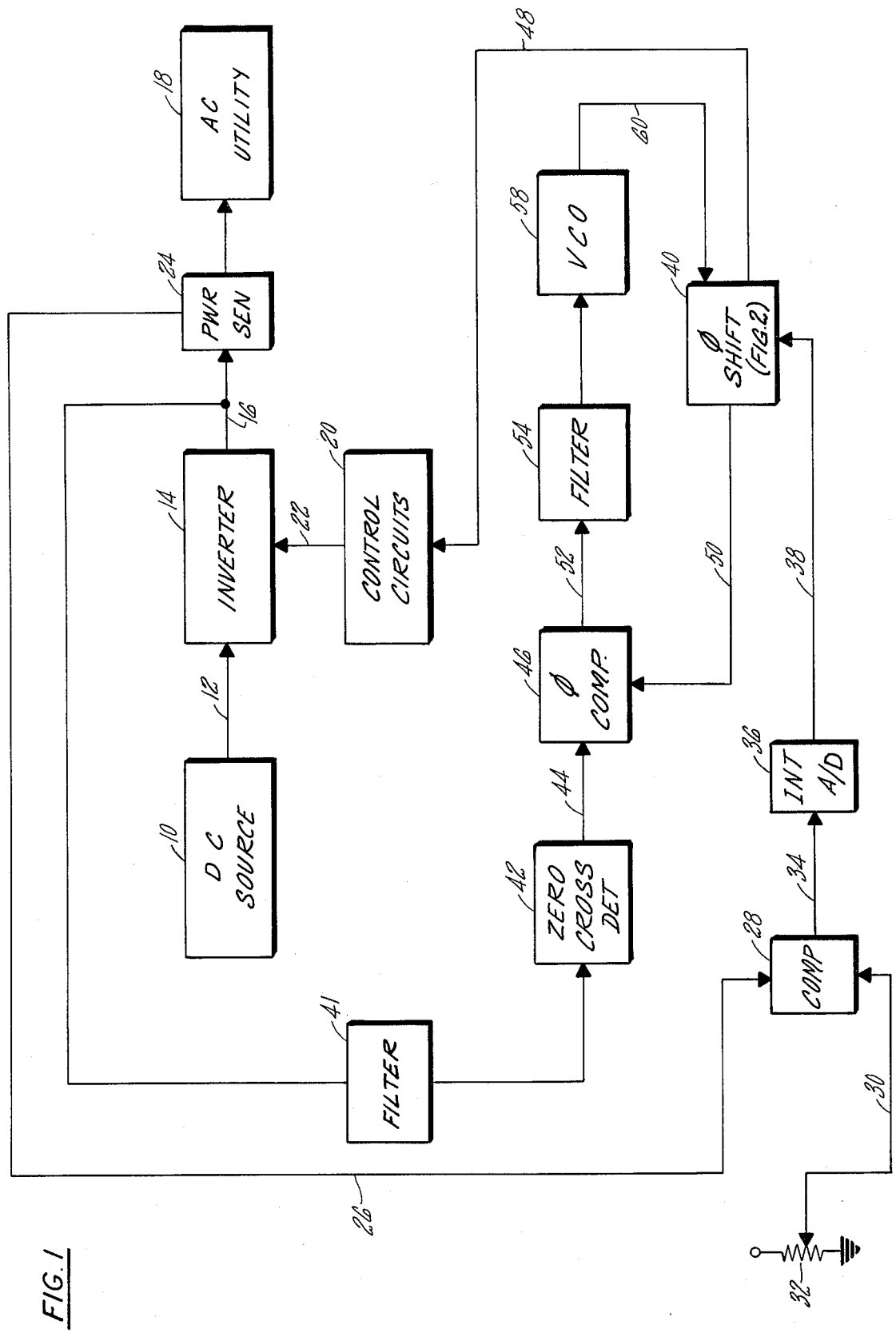
FIG. 1 is an illustration of a composite control system utilizing the phase adjustment circuit of the present invention.

Referring initially to FIG. 1, the DC source 10, such as a fuel cell or the like, presents direct current electrical energy on the line 12 to an inverter 14. The inverter 14 typically includes at least one or more pairs of switching elements, and by alternatively actuating these elements, the electrical energy from the DC source is transformed to single phase or three phase alternating current (AC) electrical energy. The inverter 14 normally includes a paralleling impedance which may comprise any power transformer and harmonic filter. This energy is then available for consumption by many known electrical devices or, as shown, can be presented on a line 16 to an AC utility 18, or the like, in which AC electrical power is distributed through a complex power network to many consumers.

In the latter case, it is particularly important that the voltage and current waveforms out of the inverter 14 be closely monitored so that the gating waveforms presented to the thyristor switching elements in the inverter can be varied, if required, to change the power supplied by the inverter to the AC utility 18. It is a common occurrence when supplying power to the AC utility 18 that the voltage and current waveforms on the line 16 may fluctuate, sometimes significantly such as in the case of lightning strikes or the like, and any control circuit must respond rapidly to these conditions so that an inverter control circuit 20 can appropriately adjust the gating signals applied to the inverter on the line 22.

Still referring to FIG. 1, a phase shift circuit for use with the control circuit of an inverter will now be described. A power sensor 24 is positioned in the line 16 to sense the magnitude and direction of AC electrical energy supplied by the inverter 14 to the AC utility 18. The output signal from the power sensor 24 is presented by a line 26 to one terminal of a comparator circuit 28. The other terminal of the comparator circuit 28 receives a reference signal presented via line 30 from a reference source 32 which is preferably adjustable so that the phase lead or lag between the inverter bridge voltage waveforms and the utility voltage waveform on line 16 can be adjusted. In turn, this varies the power supplied by the inverter 14 to or from the AC utility 18. The output from the comparator is an error signal which indicates the deviation, if any, between the magnitude and polarity of the signal on the line 26, which is proportional to the power on line 16, compared to the preselected value from the adjustable control 32. This error signal is presented to an integrating A/D converter 36 which quantizes the magnitude and the polarity of the analog signal on the line 34 into one of a number of preselected levels for presentation on the line 38 to the phase shifter 40, the details of which will be discussed further hereinafter.

According to the present invention, a particular feature of a phase adjustment circuit is that it senses the phase of the voltage waveform on the line 16 and presents a proportionally phased signal waveform to the gating circuits 20, this waveform being employed to change the power output from the inverter 14 by adjusting the thyristor switching waveforms. The control problem is complicated by the fact that the voltage waveform on the line 16 is subject to transient conditions which cause amplitude variations which can distort precise phase measurement and adjustment. In the present invention, bandpass filter 41, tuned to 60 hertz is connected by line 44 to the transmission link between the inverter and the utility, the line 16, and presents a signal to a zero crossover detector 42 for sensing the phase of the voltage waveform thereon. The zero crossover detector 42 senses the individual zero crossing points of the monotonic waveform of the voltage on the line 16 and presents a digital signal to a phase-locked loop on the line 44. The phase-locked loop then utilizes the signal waveform on line 44 modified by any offset presented on the line 38 to create a properly phased signal out of the phase shifter 40 on the line 48 for use by the inverter control circuits 20.

The input of the phase-locked loop is controlled by the phase comparator circuit 46 which combine the feedback signal on a line 50 from the phase shifter 40 with the signal waveform on the line 44, a signal whose period corresponds to that of the voltage waveform on line 16. The output of the phase comparator circuit 46 is fed via a line 52 to a filter 54 which effectively integrates the pulses to provide a DC error signal on a line 56 which is suitable for driving the VCO (voltage controlled oscillator) 58. The VCO 58 provides a signal output on the line 60 to the phase shifter 40 of a frequency $f_o$ which is selected to be sufficiently high for obtaining a desired amount of resolution within the phase shifter 40. For example, if the AC utility is operating at 60 hertz and it is desired to have the phase-locked loop respond to variation of as small as one-eighth of an electrical degree, then $f_o$ for the VCO 58 is 172.8 kilohertz.

Figure 2:
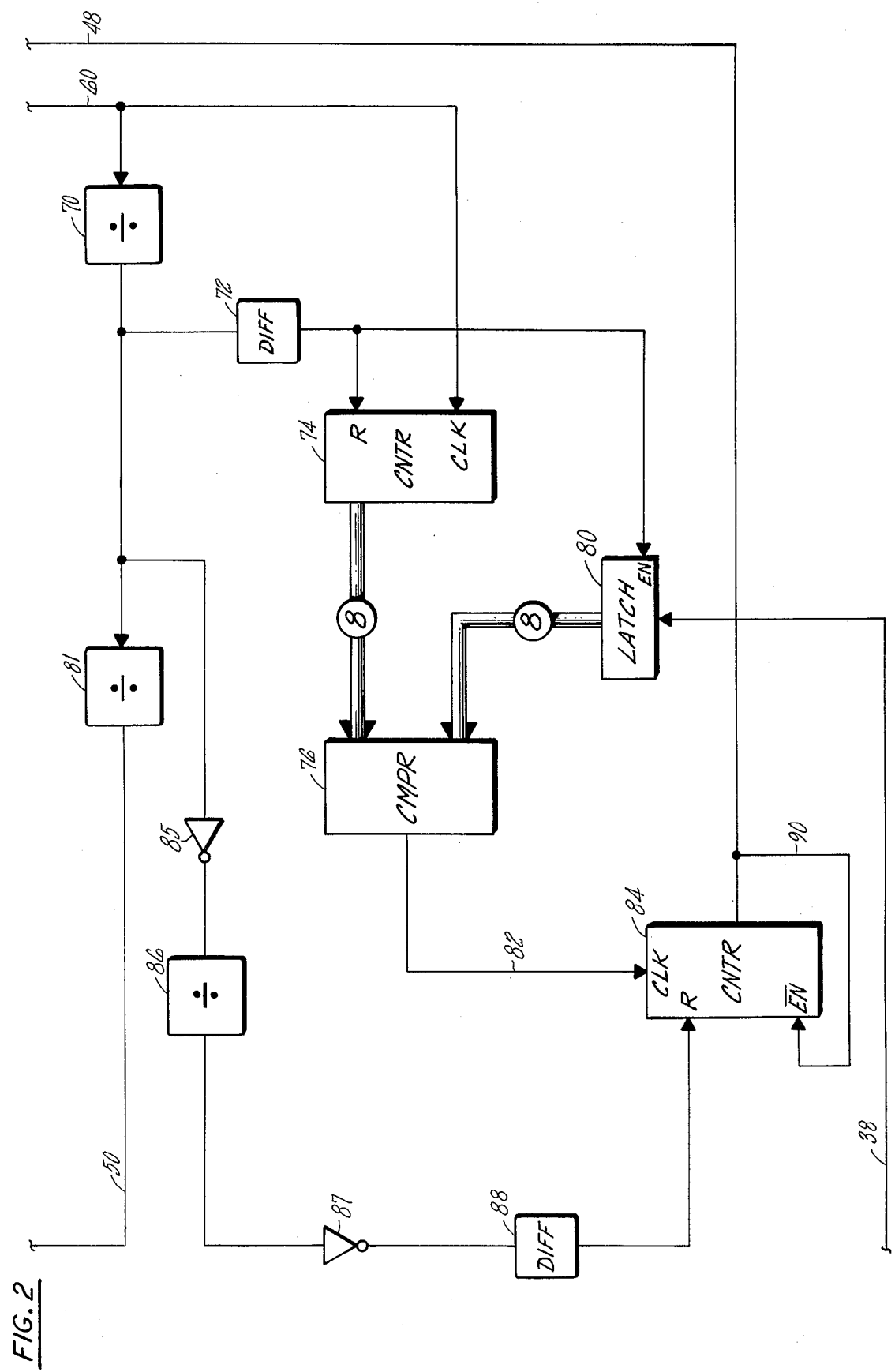
FIG. 2 is one embodiment of a phase shift circuit of FIG. 1.

Referring now to FIG. 2, in addition to FIG. 1, the operation of the phase adjustment circuit in conjunction with the operation of a specific embodiment of the phase shifter 40 will now be described. As indicated hereabove, one of the advantages of the particular phase shifter of the present invention is that it phase shifts the output waveform on the line 48 used by the control circuit of the inverter in a leading or lagging direction when compared to the input phase of the signal presented to the phase-locked loop on the line 44. Accordingly, a frequency divider 70 receives the signal waveform from the VCO 58 on line 60 and presents it through a differentiator 72 to the reset of a counter 74. The frequency of operation of the divider 70 is selected to be sufficiently high to provide the desired lead or lag phase shift range between the input and output waveforms of the phase-locked loop. For example, if a ±15° phase shift range is desired, then the output frequency of 7.2 kilohertz, when differentiated, is suitable for resetting the counter 74. The counter 74 is at least an eight bit counter which is clocked by the output waveform from the VCO 58 and presents an eight bit word to a digital comparator 76. The digital comparator 76 also receives an eight bit word from a latch 80, the output of which is related to the particular level at its input provided by the integrating A/D converter 36. The latch 80 is enabled by a signal from the differentiator 72 which is phased with the input waveform on the line 44 to present an eight bit word to the comparator 76 every 30 electrical degrees.

The signal waveform from the divider is presented to a frequency divider 81, a divide by 12 counter, to supply the signal waveform on the line 50 to the phase comparator 46 closing the feedback loop. The signal waveform from the divider 70 is also presented through an inverter 85 to a frequency divider 86, a divide by 12 counter, which changes the frequency to the basic 60 hertz waveform. This signal is then presented through an inverter 87 and a rising edge differentiator 88 to reset a counter 84. Hence, the counter 84 is reset by the rising edge of the waveform on the line 86. After each reset the counter 84 counts six pulses from the output of the comparator 76 on the line 82 and sets a latch on the line 48 to the inverter control circuits. Rising edge of the pulse on the line 48 is phase shifted relative to the pulse on the line 50 by predetermined lead or lag angles, per the level of the input to the latch 80. The rising edge of the pulse on line 48 is also fed back via a line 90 to disable the counter 84 until the next reset pulse.

The counter circuit 74 counts from the leading edge of the waveform out of the divider 70 to the comparable word from the latch 80. When the two words match, a pulse is presented on line 82 to a clock input of the divider circuit 84. The counter 84 is periodically reset by the trailing edge of the waveform from the divider 70, this signal having essentially the same phase as the input signal to the phase-locked loop.

It should also be understood that the phase adjustment circuit of the present invention has wide applications in fields other than with inverter control circuits. For example, in the computer area where a central processing unit is commutating with a plurality of terminals, phase shift keying is often employed to identify specific teminals by their phase displacement from a master clock pulse. In this method the period between repetitive clock pulses would be divided into a plurality of time slots, each slot being assigned to a separate terminal. The particular time slot can then be used for the transfer of data between the central processing unit and that particular terminal.

Although the invention has been shown and described with respect to the preferred embodiment thereof, it should be understood by those skilled in the art that various changes and omissions in the form and detail thereof may be made therein without departing from the spirit and the scope of the invention.

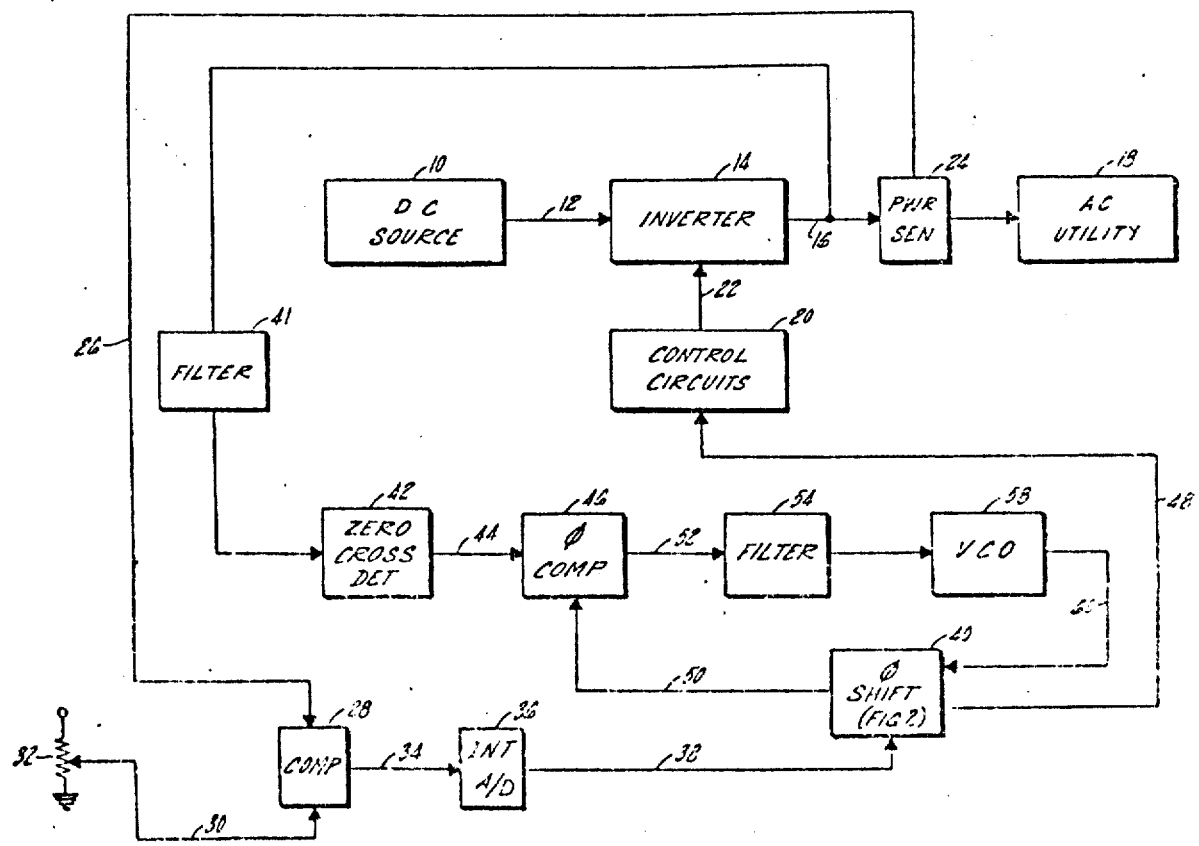

Having thus described typical embodiments of my invention, that which I claim as new and desire to secure by Letters Patent of the United States is:

1. A circuit for sensing at least one condition in an electrical path and for providing an output signal calculated to change said one condition by a preselected amount, comprising:

phase comparison means responsive to a waveform in said electrical path and to a feedback signal for providing an error signal proportional to any phase difference between said waveform in said electrical path and said feedback signal;

oscillator means connected to the output of said phase comparator means for providing an output signal whose frequency is proportional to the magnitude of the phase error signal;

sensor means positioned in said electrical path for providing a sensor output signal indicative of said condition in said electrical path;

comparator means connected to receive both said sensor output signal and a reference signal for providing a command signal related to the differences therebetween;

phase shift means disposed in a feedback loop from the output of said oscillator means to said phase comparator means for responding to said command signal by shifting the phase of said feedback signal; and whereby said command signal presented to said phase shift means is indication of a desired deviation, if any, between sensor output signal and said command signal thereby causing said phase comparator means to shift the phase of said feedback signal supplied to said phase comparison by an amount proportional to such desired deviation so that said oscillator means tracks, in frequency, any difference between said at least one condition in said electrical path and said command signal.

2. A phase adjustment circuit according to claim 1, wherein said phase shift means includes a digital comparator means for comparing a digital signal representing said command signal with a digital word representing phase of said output signal from said oscillator means.

3. A phase adjustment circuit according to claim 1, further including a counter means clocked by the output of said comparator means, said counter means being reset by a signal from said oscillator means after six output pulses from said comparator means.

4. A circuit according to claim 1, wherein said one condition in said electrical path is the magnitude and direction of electrical power flow between a DC source and an AC power grid, and wherein an inverter is located between said DC source and said AC power grid, and wherein the phase comparison means responds to the phase of a voltage waveform out of said inverter in that such magnitude and direction of power flow between said DC source and said AC power grid is primarily related to the phase of the voltage waveform out of said inverter.

5. A circuit according to claim 4, wherein said inverter includes a control circuit for varying the phase of said voltage waveform out of said inverter, and wherein said phase shift means is connected to said control circuit for providing a signal waveform that adjusts the phase of the voltage waveform out of said inverter.

6. A circuit according to claim 1, wherein the reference signal to said comparator means is a continuously variable voltage which can be manually set to provide an indication of the desired power flow between a DC source and an AC power grid.

7. A circuit according to claim 1, wherein said oscillator means is a voltage controlled oscillator.

* * * * *

UNITED STATES PATENT AND TRADEMARK OFFICE
CERTIFICATE OF CORRECTION

PATENT NO. : 4,330,717

DATED : May 18, 1982

INVENTOR(S) : Allen K. Coleman

It is certified that error appears in the above—identified patent and that said Letters Patent is hereby corrected as shown below:

The Title Page should appear as shown on the attached sheet.

Signed and Sealed this

Twentieth Day of July 1982

[SEAL]

Attest:

*Attesting Officer*

GERALD J. MOSSINGHOFF

*Commissioner of Patents and Trademarks*

United States Patent [19]
Coleman

[11] 4,330,717
[45] May 18, 1982

[54] PHASE ADJUSTMENT CIRCUIT

[75] Inventor: Allen K. Coleman, Manchester, Conn.

[73] Assignee: United Technologies Corporation, Hartford, Conn.

[21] Appl. No.: 209,080

[22] Filed: Nov. 21, 1980

Related U.S. Application Data

[63] Continuation of Ser. No. 973,301, Dec. 26, 1978.

[51] Int. Cl.³ .................................................. H02J 3/32
[52] U.S. Cl. ...................................... 307/46; 307/66; 328/133; 363/96
[58] Field of Search ................... 331/1 A, DIG. 2; 328/133; 307/64, 66, 46; 363/35, 37, 96, 128, 137; 323/207

[56] References Cited

U.S. PATENT DOCUMENTS

| | | | |
|---|---|---|---|
| 3,199,037 | 8/1965 | Graves | 323/101 |
| 3,337,814 | 8/1967 | Brase et al. | 331/1 A |
| 3,551,826 | 12/1970 | Sepe | 331/1 A |
| 3,863,134 | 1/1975 | Pollard | 363/137 |
| 3,872,397 | 3/1975 | Hanneman | 331/1 A |
| 4,071,780 | 1/1978 | Burnett | 331/1 A |
| 4,241,261 | 12/1980 | Ebert | 307/64 |
| 4,251,735 | 2/1981 | Coleman | 307/66 |
| 4,251,736 | 2/1981 | Coleman | 307/66 |

OTHER PUBLICATIONS

IEEE Paper F 77101-9, "The Interaction of Batteries and Fuel Cells with Electrical Distribution Systems:***", Jan. 30, 1977.

*Primary Examiner*—William H. Beha, Jr.
*Attorney, Agent, or Firm*—Richard P. Lange

[57] ABSTRACT

A phase adjustment circuit for sensing the phase of the signal at the output of an inverter and for providing a signal to the control circuits of the inverter whose phase has been offset by a preselected amount. The phase adjustment circuit includes a zero crossover detector for sensing the crossover points of the inverter output voltage. A phase-locked loop includes a phase comparator which receives the signal indicating the zero crossover points and a feedback signal from a phase shifter. The output of the phase comparator is an error signal which is integrated and presented to a voltage controlled oscillator to change the phase of its output signal. The phase shifter combines the phased waveform out of the voltage controlled oscillator with a command signal indicating the desired phase offset to form a feedback signal for presentation to the phase comparator closing the feedback loop. At the same time, the phase comparator provides a signal to the control circuit of the inverter whose phase has been precisely controlled to lead or lag the inverter output waveform by the desired offset.

7 Claims, 2 Drawing Figures